US009363168B2

(12) United States Patent
Enyedi et al.

(10) Patent No.: US 9,363,168 B2
(45) Date of Patent: Jun. 7, 2016

(54) TECHNIQUE FOR OPERATING A NETWORK NODE

(75) Inventors: Gabor Sandor Enyedi, Bekescsaba (HU); András Császár, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 14/007,779

(22) PCT Filed: Feb. 15, 2012

(86) PCT No.: PCT/EP2012/000667
§ 371 (c)(1),
(2), (4) Date: Sep. 26, 2013

(87) PCT Pub. No.: WO2012/130357
PCT Pub. Date: Oct. 4, 2012

(65) Prior Publication Data
US 2014/0016457 A1  Jan. 16, 2014

Related U.S. Application Data

(60) Provisional application No. 61/469,935, filed on Mar. 31, 2011.

(51) Int. Cl.
H04L 12/703 (2013.01)
H04L 12/707 (2013.01)
H04L 12/761 (2013.01)

(52) U.S. Cl.
CPC .............. *H04L 45/28* (2013.01); *H04L 45/16* (2013.01); *H04L 45/22* (2013.01); *H04L 45/24* (2013.01)

(58) Field of Classification Search
None
See application file for complete search history.

(56) References Cited

U.S. PATENT DOCUMENTS 6,154,507 A * 11/2000 Bottomley ..................... 375/340
6,538,987 B1 * 3/2003 Cedrone et al. ............... 370/216

(Continued)

FOREIGN PATENT DOCUMENTS

JP   2009296493 A   12/2009

OTHER PUBLICATIONS

Fenner, B. et al. "Protocol Independent Multicast—Sparse Mode (PIM-SM): Protocol Specification (Revised)." Network Working Group. The Internet Society. Feb. 2006.

(Continued)

*Primary Examiner* — Bunjob Jaroenchonwanit
(74) *Attorney, Agent, or Firm* — Murphy, Bilak & Homiller, PLLC

(57) ABSTRACT

A technique of operating a network node of a multicast communication network comprising a plurality of network nodes which are interconnected with each other by communication links is provided, wherein the network node is associate with a common source network node. A method implementation of the technique comprises: determining a first path which connects the network node to the common source network node along a primary network tree, and determining a second path which connects the network node to the common source network node along a secondary network tree, wherein the first path and the second path show redundancy with respect to each other; receiving, at the network node, multicast data from the common source network node via the first path; triggering, by the network node, reception of multicast data from the common source network node via the second path if the network node detects a failure of the first path (e.g., determines that no multicast data is received via the first path).

19 Claims, 7 Drawing Sheets

(56) References Cited

U.S. PATENT DOCUMENTS

| | | | |
|---|---|---|---|
| 7,020,086 B2* | 3/2006 | Juttner et al. | 370/238 |
| 7,987,259 B2* | 7/2011 | Asati et al. | 709/224 |
| 2002/0028656 A1* | 3/2002 | Yemini et al. | 455/41 |
| 2002/0150094 A1* | 10/2002 | Cheng et al. | 370/389 |
| 2002/0150099 A1* | 10/2002 | Pung et al. | 370/390 |
| 2005/0086469 A1* | 4/2005 | Dunagan et al. | 713/163 |
| 2005/0111351 A1 | 5/2005 | Shen et al. | |
| 2007/0019646 A1 | 1/2007 | Bryant et al. | |
| 2008/0267078 A1* | 10/2008 | Farinacci et al. | 370/244 |
| 2009/0022070 A1* | 1/2009 | Iovanna et al. | 370/256 |
| 2010/0091648 A1* | 4/2010 | Zhao | 370/225 |
| 2010/0265945 A1 | 10/2010 | Bejerano et al. | |
| 2011/0058548 A1* | 3/2011 | Fernandez Gutierrez | 370/390 |
| 2012/0147885 A1* | 6/2012 | Johri et al. | 370/390 |
| 2014/0211797 A1* | 7/2014 | Luo et al. | 370/390 |

OTHER PUBLICATIONS

Shand, M. et al. "IP Fast Reroute Framework." Internet Engineering Task Force. Jan. 2010.

Luebben, Ralf et al. "Fast Rerouting for IP Multicast in Managed IPTV Networks." Institute of Computer Science, University of Göttingen, Germany. At&T Labs Research, New Jersey, USA.

Enyedi, G. et al. "On Finding Maximally Redundant Trees in Strictly Linear Time." IEEE 2009.

Fei, Aiguo et al. "A 'Dual-Tree' Scheme for Fault-Tolerant Multicast." 2001 IEEE International Conderence on Communications. Jun. 11, 2001. Helsinky, Finland.

Liu, H. et al. "Single Stream Milticast Fast Reroute (SMFR) Method." Huawei Technologies. Internet Engineering Task Force, IETF. Jul. 5, 2010. Geneva, Switzerland.

* cited by examiner

| Destination | Route |
|---|---|
| S1 | NextHop1 |
| S2 | NextHop2 |
| S3 | NextHop1 |
| S4 | NextHop3 |
| S5 | NextHop2 |
| | |
| | |
| | |
| | |
| | |

} Typically filled by unicast routing protocols, i.e. represent reverse shortest paths

| Destination | Route |
|---|---|
| S1 | NextHop1 |
| S2 | NextHop2 |
| S3 | NextHop3 |
| S4 | NextHop2 |
| S5 | NextHop4 |
| S1$_{Backup}$ | NextHop2 |
| S2$_{Backup}$ | NextHop3 |
| S3$_{Backup}$ | NextHop4 |
| S4$_{Backup}$ | NextHop3 |
| S5$_{Backup}$ | NextHop2 |
| | |

101 — Filled so that entries correspond to primary tree

Filled so that entries correspond to *secondary* tree

102

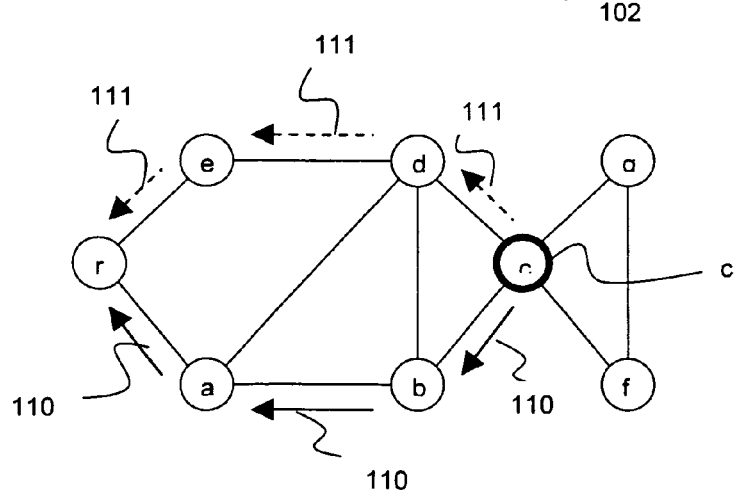

TECHNIQUE FOR OPERATING A NETWORK NODE

TECHNICAL FIELD

The present disclosure generally relates to the technical field of operating a network node. In particular, the present disclosure relates to operation of a network node of a multicast communication network, a common source network node of a multicast communication network, and the multicast communication network itself. Further, the present disclosure relates to a network node, a common source network node, and a multicast communication network.

BACKGROUND

Protocol Independent Multicast Sparse Mode (PIM-SM) (see IETF RFC4601 of August 2006) is a well known and commonly applied protocol for building up and maintaining multicast trees in Internet Protocol (IP) multicast communication networks. In order to distribute multicast content to network nodes (hereinafter also referred to as "destinations") of the multicast communication network, PIM-SM uses a single multicast tree.

In PIM-SM, a network node uses unicast forwarding of JOIN messages in order to join or to leave a multicast group. In order to join a multicast group, the network node sends a JOIN message in upstream direction of the multicast tree to a common source network node (the term "common source network node" hereinafter also includes a rendezvous point in the case of a shared tree). The JOIN message is routed along a path of the multicast tree determined by Multicast Routing Information Base (MRIB) tables. The paths listed in these tables are usually derived directly from unicast routing tables (but they could also be derived differently). Similarly, a network node wanting to leave a multicast group sends a PRUNE packet up the multicast tree to the common source network node.

The MRIB tables are used to determine next-hop neighbors to which the JOIN message is sent next. The JOIN message is routed and processed on a hop-by-hop basis until a network node already receiving the multicast content is reached. All network nodes along this path process the JOIN message and install/update corresponding multicast routing state information (e.g. by adding an incoming interface via which the JOIN message was received to an outgoing interface list). Multicast content flows along are routed a path which is reversed to that along which the JOIN messages (downwards direction).

Since, as already mentioned, the MRIB tables are usually derived from unicast routing tables, the JOIN messages are forwarded along the shortest path to the common source network node, which may differ from the shortest downstream path in the case of asymmetric link costs. As a result, multicast streams established using PIM-SIM may use sub-optimal paths in a downward direction.

Since PIM-SM strongly depends on unicast routing, in case of a network failure, it has to be waited until the unicast routing has recovered. Thus, failure reaction is relatively slow. On the other hand, PIM-SM is commonly used nowadays for building up paths for real-time traffic (e.g. for IPTV). This means that failure reaction is a serious drawback. In order to overcome this drawback, IETF RFC5714 of January 2010 proposes creating a secondary path for an incoming multicast stream of a network node, thereby providing an immediate alternative path should a network node lose its connection with its primary upstream neighbor network node. However, this approach cannot guarantee that all possible failure scenarios can be handled. Moreover, this approach is a "1+1" protection technique, which means that the "secondary" traffic is always present, even in a failure free situation, so this approach causes significant extra load in the multicast network, especially in the case of high bandwidth traffic such as HD IPTV streams.

An alternative approach is disclosed in R. Luebben, G. Li, D. Wang, R. Doverspike, X. Fu., "Fast rerouting for IP multicast in managed IPTV networks", in 17th International Workshop on Quality of Service, 2009. IWQoS., pages 1-5, July 2009. In this approach, however, strictly selected asymmetric link costs and tunneling are needed. Since changing carefully assigned link costs is not always acceptable for network operators, and since even packet fragmentation caused by tunneling can become problematic, this approach is not always applicable.

SUMMARY

A need arises to provide a method of operating network nodes of a multicast network that guarantees a flexible and quick reaction on network failures.

According to a first aspect, a method of operating a network node of a multicast communication network comprising a plurality of network nodes which are interconnected with each other by communication links is provided, wherein the network node is associated with a common source network node. The method comprises determining a first path which connects the network node to the common source network node along a primary network tree, and determining a second path which connects the network node to the common source network node along a secondary network tree, wherein the first path and the second path show redundancy with respect to each other; receiving, at the network node, multicast data from the common source network node via the first path; triggering, by the network node, reception of multicast data from the common source network node via the second path if the network node detects a failure of the first path.

A failure of the first path may be detected if no multicast data is or will be received. In this regard, various detection mechanisms may be applied, for example based on expiry of a timer, receipt of a dedicated message, lack of receipt of multicast data (e.g., multicast traffic packets) or heartbeat signals, and so on.

In one exemplary realization the first path and the second path may be determined in advance, so that, in case of a later network failure, an efficient failure management is possible.

The first path and the second path may show as much redundancy with respect to each other as technically possible. The primary network tree and the secondary network tree may be realized as Maximally Redundant Trees (MRTs). The first path and the second path along the primary tree and the secondary tree, respectively, may be link disjoint as far as possible (e.g., only unavoidable cut-vertices and cut-edges may be shared by both paths).

Maximum redundancy may be implemented such that in case of any single link/node failures, each network node is reachable from the root along at least one of the primary tree and the secondary tree. That is, in case of a network failure, some network nodes may be reachable via the primary network tree and the secondary network tree (in which case they can in principle discard one of the trees), and some network nodes only via one of them. It should be noted that neither the primary tree nor the secondary tree may necessarily be a shortest path three (as typically utilized in, for example, PIM-SM).

A calculation process may be carried out in the network node in which the primary network tree and the secondary network tree are respectively determined. In this context it becomes possible to simultaneously determine the primary network tree and the secondary network tree in one or more network nodes of the multicast network (e.g., in advance), which may speed up the rerouting in case of a later network failure.

If the network node detects a failure of the first path, a failure message may be sent. The failure message may be sent from the network node via the second path towards the common source network node.

In order to detect a failure, the following processes may be carried out: checking (e.g., in randomly chosen or in regular time intervals) whether signaling (e.g., heartbeat signals or multicast traffic packets) has been received at the network node from the common source network node via the first path; and detecting a failure if the network node has not received signaling as expected (e.g., over a predetermined period of time). In this way, an early detection of a network failure can be guaranteed.

A multicast tree may be described by a group address (this can be the destination address of IP data packets sent down the multicast tree from the common source network node (or rendezvous point)), and by a source address (assigned to the common source network node (or rendezvous point)). In order to be able to switch between two multicast trees, two addresses may be assigned to the common source network node (or rendezvous point) so that the multicast communication network can be operated as follows. The network node may maintain a primary source IP address assigned to the primary network tree, and a secondary source IP address assigned to the secondary network tree. When forwarding IP data packets from the network node to a further network node via the primary network tree, the primary source IP address may be added to the IP data packet before it is forwarded, and, when forwarding IP data packets from the network node to the further network node via the secondary tree, the secondary source IP address may be added to the IP data packet before it is forwarded.

The first path may be activated by sending an activation message from the network node to the common source network node via the first path. Additionally, or as an alternative, the second path may be activated by sending an activation message from the network node to the common source network node via the second path.

According to an exemplary implementation, the following processes may be carried out: associating the network node with the common source network node by sending an activation message from the network node to the common source network node via the first path; receiving, at the network node, after having sent the activation message to the common source network node, multicast data from the common source network node via the first path; sending, if the network node detects a failure of the first path, an activation message from the network node to the common source network node via the second path; and receiving, at the network node, after having sent the activation message to the common source network node, multicast data from the common source network node via the second path.

In this implementation ("recovery mode"), the second path may only be precalculated, but not preactivated. The switching form the first path to the second path may be initiated by the activation message (e.g., a PIM JOIN message or a similar message in other protocol contexts). Only the leg(s) (e.g., second path(s)) of the secondary network tree may activated which is needed to reach the network node(s) that detected the failure. The leg may cross several network nodes, which may or may not receive traffic (such as multicast content packets) from the primary network tree, too. That is, after having sent the activation message to the common source network node via the second path, multicast data may be received at some other network nodes via the first path and via the second path concurrently. The activation message may initiate thus both building up and activating a path.

According to a further exemplary implementation, the following processes may be carried out: associating the network node with the common source network node by sending a path build message from the network node to the common source network node via the first path, and by sending a path build message from the network node to the common source network node via the second path; receiving, at the network node, after having sent the path build messages to the common source network node, multicast data from the common source network node via the first path; sending, if the network node detects a failure of the first path, an activation message from the network node to the common source network node via the second path; and receiving, at the network node, after having sent the activation message to the common source network node, multicast data from the common source network node via the second path.

In this implementation ("simple protection mode"), in order to activate the second path, two messages (path build message in order to build up the path and activation message in order to activate the path) may be defined, in contrast to the recovery mode in which building up and activating a path may both be initiated by just one message. In this implementation, upon reception of the failure message, the common source network node may start transmitting multicast content on the whole secondary tree, too. That is, after having sent the network failure message (activation message) to the common source network node via the second path, all network nodes of the multicast network associated with (e.g., registered at) the common source network node may receive multicast data from the common source network node via corresponding first paths and second paths concurrently.

According to another exemplary realization, the following processes may be carried out: associating the network node with the common source network node by sending a path build message of a first type from the network node to the common source network node via the first path, and sending a path build message of a second type from the network node to the common source network node via the second path; receiving at the network node, after having sent the path build message of the first type to the common source network node, multicast data from the common source network node via the first path; sending, if the network node detects a failure of the first path, an activation message from the network node to the common source network node via the second path; and receiving, at the network node, after having sent the activation message to the common source network node, multicast data from the common source network node via the second path. The path build message of the first type may build and activate the first path, and the path build message of the second type may only build the second path, but cause a preliminarily blocking of data transmission from the common source network node to the network node via the second path. The preliminary blocking may be released as soon as the activation message is sent from the network node to the common source network node via the second path.

In this implementation ("advanced protection mode"), switching from the first path to the second path is not done by building up the second path (it is already prebuilt), but by sending a corresponding activation message. Switching may be done by the common source network node upon reception of the activation message as well as by all network nodes between the failure detecting network node and the common source network node (i.e., all network nodes along the second path). In this embodiment, like in the recovery mode, only the leg (i.e., second path) of the secondary tree may be used (that which is needed to reach the network node that detected the failure), and other second paths may not be activated. The leg may cross several network nodes, which may or may not receive traffic (such as multicast content packets) from the first tree, too. That is, after having sent the activation message to the common source network node via the second path, multicast data may be received at some other network nodes via the first path and via the second path concurrently.

Compared to the simple protection mode, the advanced protection mode has the advantage that only the de-blocked second path is used in the secondary tree, thus avoiding information traffic along the second paths of the other nodes. In simple protection mode, the failure message may unblock the complete second tree (no ports are blocked).

After having detected a failure of the first path, a new primary network tree and a new secondary network tree within the multicast communication network may be determined. The new primary network tree may and the new secondary network tree share the common source network node. A new first path which connects the network node to the common source network node along the new primary network tree, and a new second path which connects the network node to the common source network node along the new secondary network tree, may be assigned to the network node, wherein the new first path and the new second path show (e.g., maximum) redundancy with respect to each other. After having determined the new primary network tree and the new secondary network tree, data from the common source node via the new first path may be received at the network node. The primary network tree and the secondary network tree may thus be optimized after a network failure.

According to a further aspect, a method of operating a common source network node of a multicast communication network comprising a plurality of network nodes which are interconnected with each other by communication links is provided, wherein the multicast communication network comprises a primary network tree and a secondary network tree which share the common source network node, and wherein, to each of a plurality of network nodes of the multicast communication network, a first path which connects the network node to the common source network node along the primary network tree, and a second path which connects the network node to the common source network node along the secondary network tree are respectively assigned, and wherein the first paths and the second paths show redundancy with respect to each other. The method comprises: sending multicast data from the common source network node to each of the plurality of network nodes which are associated with the common source network node via the respective first paths; upon receipt by the common source network node of a message from a network node indicating a failure of the first path assigned to the network node, sending data from the common source network node to at least one of the plurality of network nodes which are associated with the common source network node via the respective second paths.

According to a still further aspect of the invention, a method of operating a multicast communication network comprising a plurality of network nodes which are interconnected with each other by communication links is provided. The method comprises: determining a primary network tree and a secondary network tree within the multicast communication network, wherein the primary network tree and the secondary network tree share a common source network node, and wherein, to each of a plurality of network nodes of the multicast communication network, a first path which connects the network node to the common source network node along the primary network tree, and a second path which connects the network node to the common source network node along the secondary network tree are respectively assigned, wherein the first paths and the second paths show redundancy with respect to each other; sending multicast data from the common source network node to each of the plurality of network nodes which are associated with the common source network node via the respective first paths; if a network node a failure of the first path assigned to the network node, sending data from the common source network node to the network node via the respective second path.

A computer program product is provided comprising program code portions for performing the steps of any embodiment of the invention when the computer program product is executed on one or more computing devices. The computer program product may be stored on a computer-readable recording medium.

According to another aspect, a multicast communication network node of a multicast communication network comprising a plurality of network nodes which are interconnected with each other by communication links may be provided, wherein the network node is configured to be associated with a common source network node. The network node being configured to determine a first path which connects the network node to a common source network node along a primary network tree, and to determine a second path which connects the network node to the common source network node along a secondary network tree, wherein the first path and the second path show redundancy with respect to each other; and being further configured to receive multicast data from the common source network node via the first path. The network node is further configured to detect a failure of the first path, and to trigger reception of multicast data from the common source network node via the second path if the processing unit detects a failure of the first path.

According to a further aspect, a common source network node is provided which can be operated in a multicast communication network comprising a plurality of network nodes which are interconnected with each other by communication links, wherein the multicast communication network comprises a primary network tree and a secondary network tree which share the common source network node, and wherein, to each of a plurality of network nodes of the multicast communication network, a first path which connects the network node to the common source network node along the primary network tree, and a second path which connects the network node to the common source network node along the secondary network tree are respectively assigned, wherein the first paths and the second paths show redundancy with respect to each other. The common source network node is configured to send multicast data from the common source network node to each of the plurality of network nodes which are associated with the common source network node via the respective first paths; to determine whether the communication unit has received a message from a network node indicating a failure of the first path assigned to the network node, and to cause the communication unit to send data from the common source network node to at least one of the plurality of network nodes which are associated with the common source network node via the respective second path.

Also provided is a multicast communication network comprising a plurality of network nodes as described herein; and a common source network node as described herein.

According to a still further aspect, a method of operating a network node of a multicast communication network comprising a plurality of network nodes which are interconnected with each other by communication links is provided, wherein the network node is associated with a common source network node. The method comprises determining a first path which connects the network node to the common source network node along a primary network tree, and determining a second path which connects the network node to the common source network node along a secondary network tree, wherein the first path and the second path show redundancy with respect to each other; receiving, at the network node, multicast data from the common source network node via the first path and the second path concurrently. The method may be combined with any of the aspects presented herein. As an example, the first path and the second path may show as much redundancy with each other as possible (e.g., in the sense of MRTs). Also the failure detection and/or reporting aspects may be implemented if desired.

According to another aspect, a multicast communication network node of a multicast communication network comprising a plurality of network nodes which are interconnected with each other by communication links may be provided, wherein the network node is configured to be associated with a common source network node. The network node being configured to determine a first path which connects the network node to a common source network node along a primary network tree, and to determine a second path which connects the network node to the common source network node along a secondary network tree, wherein the first path and the second path show redundancy with respect to each other; and being further configured to receive multicast data from the common source network node via the first path and the second path concurrently.

BRIEF DESCRIPTION OF THE DRAWINGS

In the following, the present disclosure will be described in more detail with reference to exemplary embodiments illustrated in the drawings, wherein

FIG. 9: is a schematic block diagram illustrating a conventional routing table used for operating a multicast communication network;

FIG. 10: is a schematic block diagram illustrating an embodiment of a modified routing table used for operating a multicast communication network;

FIG. 11: is a schematic block diagram illustrating an embodiment of a multicast communication network.

DETAILED DESCRIPTION

Figure 1:
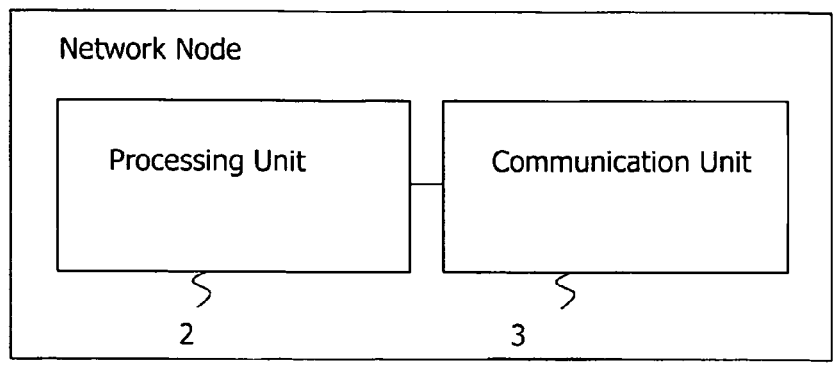
FIG. 1: is a schematic block diagram illustrating an embodiment of a network node of a multicast communication network.

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details. For example, while the following embodiments will primarily be described in connection with PIM and PIM-SM, it will be readily understood that the technique presented herein may also be embodied in connection with other standards and specifications, including multicast MLPS (mLDP). In case of mLDP, Label Map messages would conceptually correspond to the PIM JOIN messages exemplarily discussed above and in the context of the following embodiments. That is, any references to PIM JOIN messages would translate into references to mLDP Label Map messages in case the PIM-related teachings presented herein were translated into an mLDP scenario.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

With respect to the following embodiments, the same reference numerals are used to denote the same or similar components.

Figure 3:
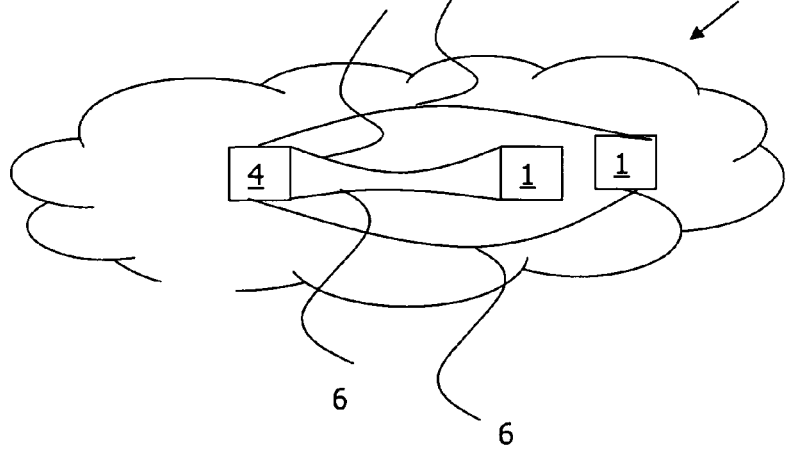
FIG. 3: is a schematic block diagram illustrating an embodiment of a multicast communication network.

With reference to FIGS. 1 and 3, a multicast communication network node 7 according to an embodiment will be described. The multicast communication network 7 comprises a plurality of network nodes 1 which are interconnected with each other by communication links. The network node 1 is configured to be associated with (e.g., registered at) a common source network node 4. In some cases, the common source network node 4 is also referred to as common root network node, or simply root node.

The network node 1 comprises a processing unit 2 configured to determine a first path 5 which connects the network node 1 to a common source network node 4 along a primary network tree, and to determine a second path 6 which connects the network node 1 to the common source network node 4 along a secondary network tree. The first path 5 and the second path 6 show redundancy with respect to each other. The network node 1 further comprise a communication unit 3 connected to the processing unit 2 and configured to receive multicast data from the common source network node 4 via the first path 5. The processing unit 2 is further configured to detect a failure of the first path (e.g., determine whether multicast data is (or will be) received by the communication unit 3 via the first path 5), and to trigger reception of multicast data from the common source network node 4 via the second path 6 if the processing unit 2 detects a failure (e.g., determines that no multicast data is (or will be) received via the first path 5).

Figure 2:
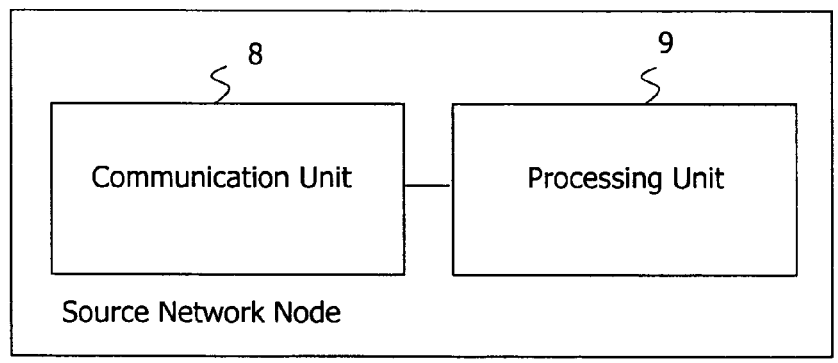
FIG. 2: is a schematic block diagram illustrating an embodiment of a common source network node of a multicast communication network.

With reference to FIGS. 2 and 3, a common source network node 4 according to an embodiment will be described. The common source network node 4 can be operated in a multicast communication network 7 comprising a plurality of network nodes 1 as discussed above which are interconnected with each other by communication links. The multicast communication network 7 comprises a primary network tree and a secondary network tree which share the common source network node 4.

As stated above, to each of a plurality of network nodes 1 of the multicast communication network 7, a first path 5 which connects the network node 1 to the common source network node 4 along the primary network tree, and a second path 6 which connects the network node 1 to the common source network node 4 along the secondary network tree are respectively assigned, wherein the first paths 5 and the second paths 6 show redundancy with respect to each other.

The common source network node 4 comprises a communication unit 8 configured to send multicast data from the common source network node 4 to each of the plurality of network nodes 1 which are associated with (e.g., registered at) the common is source network node 4 via the respective first paths 5. The common source network node 4 further comprises a processing unit 9 connected to the communication unit 8 and configured to determine whether the communication unit 8 has received a message from a network node 1 indicating a failure of the firth path (e.g., that no data is received by the network node 1 from the common source network node 4 via the first path 5 assigned to the network node 1). The processing unit 9 is further configured to cause the communication unit 4 to send data from the common source network node 4 to at least one of the plurality of network nodes 1 which are associated with the common source network node 4 via the respective second paths 6.

Figure 4:
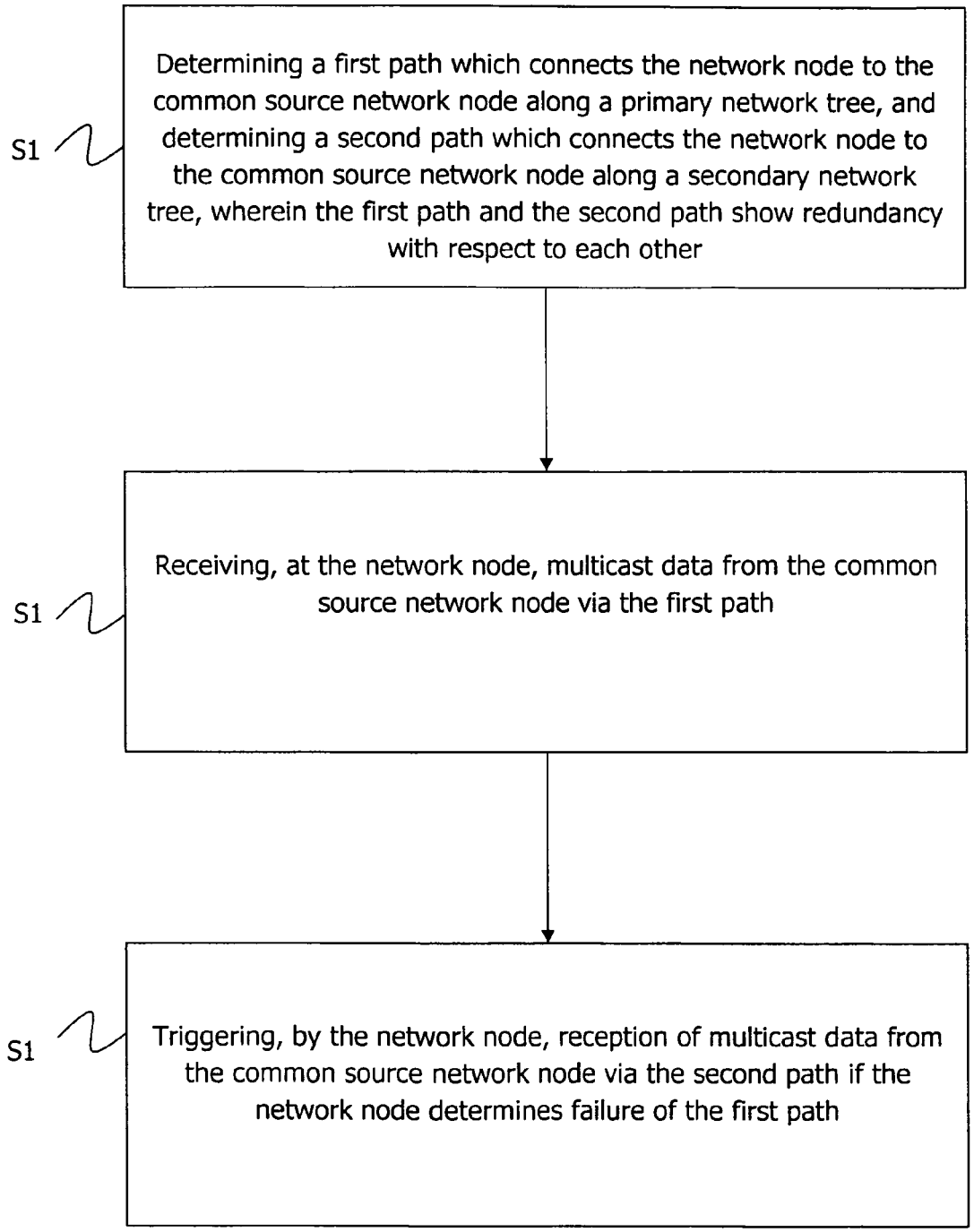
FIG. 4: is a flow chart illustrating an embodiment of operating a network node of a multicast communication network.

FIG. 4 shows a method of operating a network node 1 as shown in FIGS. 1 and 3 according to an exemplary embodiment. In a first step S1, a first path 5 is determined which connects the network node 1 to the common source network node 4 along a primary network tree, and a second path 6 is determined which connects the network node 1 to the common source network node 4 along a secondary network tree. The first path 5 and the second path 6 show redundancy (e.g., maximum redundancy) with respect to each other.

In a second step S2, at the network node 1, multicast data is received from the common source network node 4 via the first path 5. Then, in a third step S3, it is triggered, by the network node 1, reception of multicast data from the common source network node 4 via the second path 6 if the network node 4 detects a failure of the first path 5. The triggering may be performed in many ways, including by sending one or more messages, packets or any other signaling depending on the protocols in use. Several triggering examples will be described in more detail below.

An advantage of this embodiment is that the first path 5 and the second path 6 can be determined in advance (e.g., during a configuration phase preceding reception of multicast data) for each network node 1. In case of a network failure, an efficient failure management thus becomes possible (only time is consumed for activating/building up the second path 6, however not for determining the second path 6).

In a modified embodiment that is based on the embodiment of FIG. 4, step S3 could be omitted and step S2 could be altered such that multicast data (e.g., multicast packets) is received via the first path and the second path concurrently. The receiver (and/or the egress/edges) would then receive at least one replica of each multicast packet on one of the paths (and trees). The replica may in one implementation simply be deleted. In an alternative step S3, a failure detected with respect to one of the first path and the second path could still be signaled by any message, packet or signaling (e.g., using a dedicated or existing message, packet or signaling towards a source node). The network node of FIG. 1 may be adapted (if needed) to implement the modified embodiment.

Figure 5:
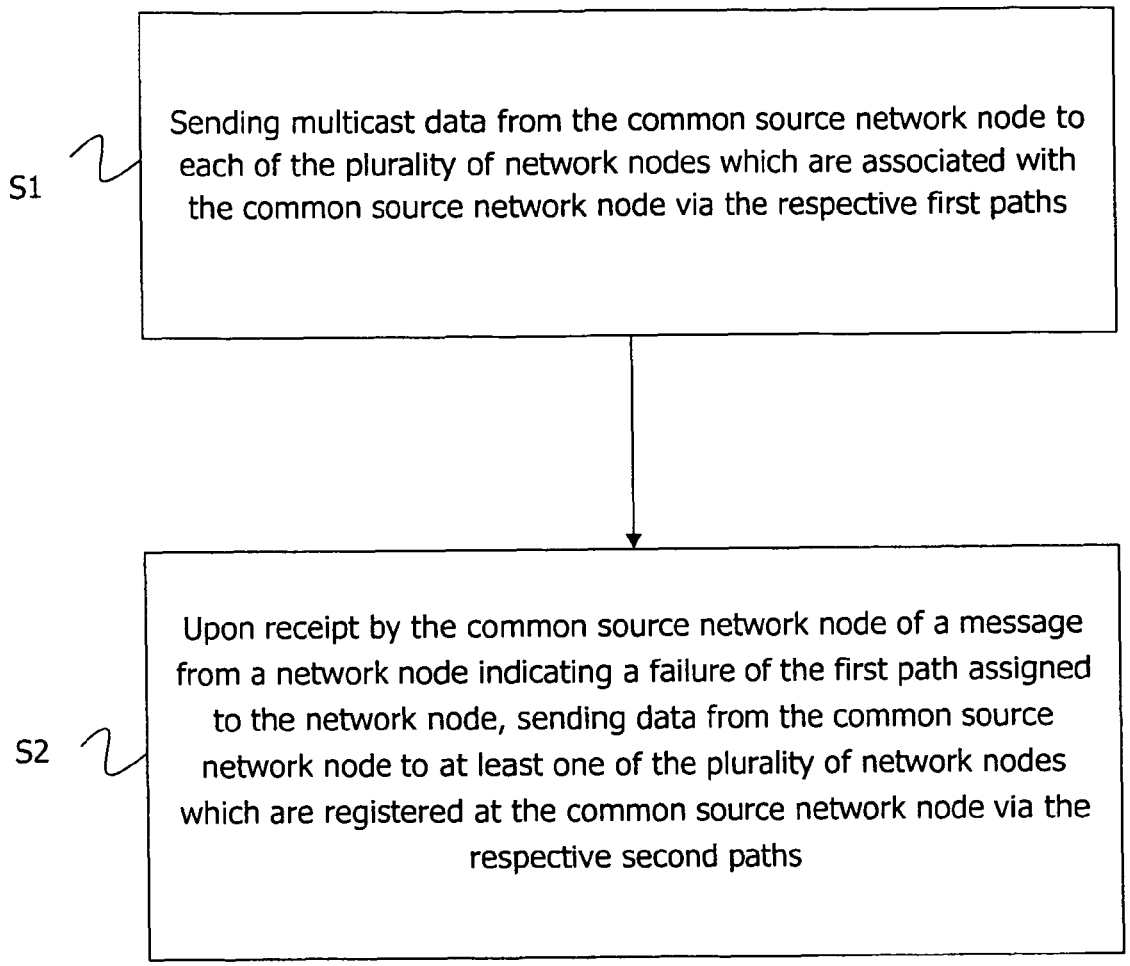
FIG. 5: is a flow chart illustrating an embodiment of operating a common source network node of a multicast communication network.

FIG. 5 shows a method of operating a common source network node 4 as shown in FIGS. 2 and 3 according to an exemplary embodiment. In a first step S1, multicast data is sent from the common source network node 4 to each of the plurality of network nodes 1 which are associated with (e.g., registered at) the common source network node 4 via the respective first paths 5. In a second step S2, upon reception of a message at the common source network node 4 from a network node 1 indicating a failure of the first path 5 (e.g., that no data is received by the network node 1 from the common network node 4 via the first path 5 assigned to the network node 1), data is sent from the common source network node 4 to at least one of the plurality of network nodes 1 which are associated with the common source network node 4 via the respective second paths 6.

Figure 6:
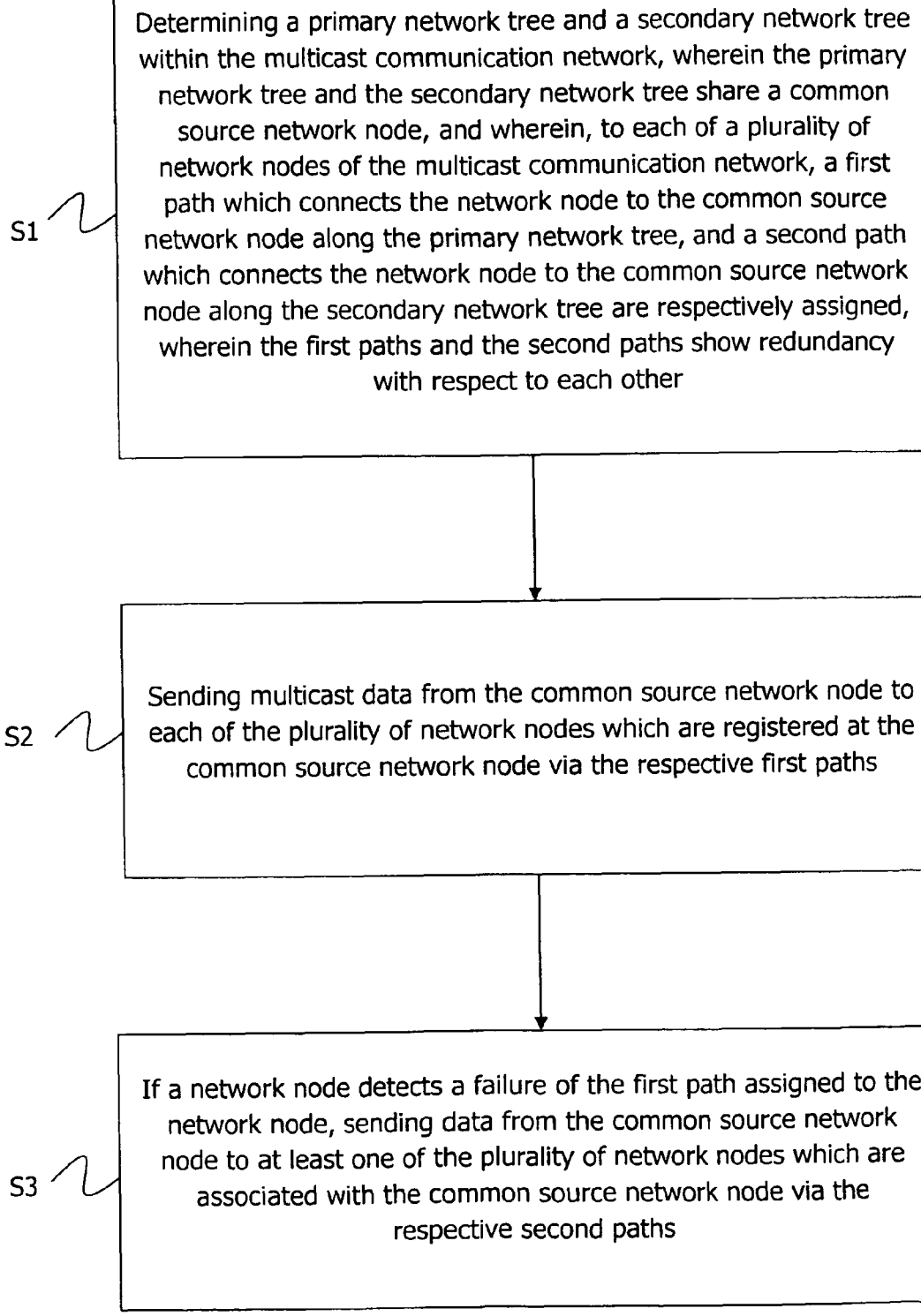
FIG. 6: is a flow chart illustrating an embodiment of operating a multicast communication network.

FIG. 6 shows a method of operating a multicast communication network 7 as shown in FIG. 3 according to an exemplary embodiment. In a first step S1, a primary network tree and a secondary network tree are determined within the multicast communication network 7. The primary network tree and the secondary network tree share a common source network node 4 and, to each of a plurality of network nodes 1 of the multicast communication network 7, a first path 5 which connects the network node 1 to the common source network node 4 along the primary network tree, and a second path 6 which connects the network node 1 to the common source network node 4 along the secondary network tree are respectively assigned. The first paths 5 and the second paths 6 show redundancy with respect to each other. In a second step S2, multicast data is sent from the common source network node 4 to each of the plurality of network nodes 1 which are associated with the common source network node 4 via the respective first paths 5. Then, in a third step S3, if a network node 1 detects a failure of the first path 5 (e.g., determines that no data is or will be received via the first path 5 assigned to the network node 1), data is sent from the common source network node 4 to at least one of the plurality of network nodes 1 which are associated with the common source network node 4 via the respective second paths 6.

In the following description, further features and embodiments will be explained. The features and embodiments described hereinafter may be combined with the features and embodiments described above with reference to FIGS. 1 to 6.

The redundancy discussed above with reference to FIGS. 1 to 6 may be realized using maximally redundant trees (see, e.g., Gábor Enyedi, Gábor Rétvári, András Császár, "On Finding Maximally Redundant Trees in Strictly Linear Time", IEEE Symposium on Computers and Communications, ISCC, Sousse, Tunisia, July 2009, herewith incorporated by reference. MRTs are a set (e.g., a pair) of directed spanning trees (in the present context, one tree of the pair of network trees is called primary tree, the other one is called backup tree or secondary tree) directed in such a way that each of the network nodes can be reached from the root network node (in the present context also referred to as "common source network node"), and the respective two paths along the two trees from the root network node to each network node have as much redundancy as it is possible. MRTs can also be defined in the reverse direction, such that the root network node is reachable from all other network nodes via respective two paths.) Generally, only those network nodes and network links are part of both paths which cannot be avoided (the cut-vertices and cut-edges). Thus, if there is a single failure, which does not split the network into two networks, the root network node can still reach each of the other network nodes in the network along at least one of the trees.

According to an embodiment the technique disclosed herein may rely on MRTs in a network in order to keep up multicast content packet forwarding in a network after a network failure. MRTs are a set of directed spanning network trees with a common root node (e.g., common source network node 4) directed in such a way that each network node (such as network node 1) is reachable from the common root node via two paths (one path running through one of the pair of network trees (primary network tree), and the other path running through the other one of the pair of network trees (secondary network tree)), and the two paths along the two network trees are as network node and network link (the network links link the network nodes with each other) disjoint as it is possible (only the unavoidable cut-vertices and cut-edges are contained by both paths).

Figure 7:
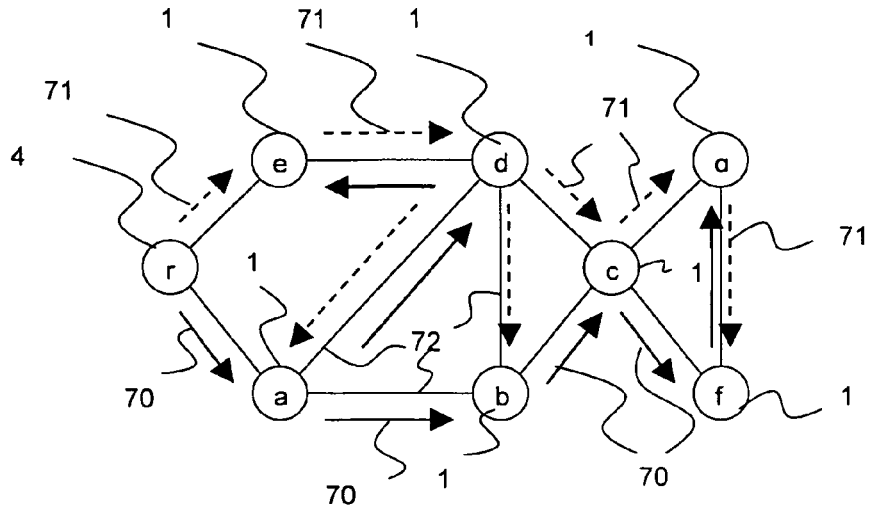
FIG. 7: is a schematic block diagram illustrating another embodiment of a multicast communication network.

An embodiment of a pair of MRTs is shown in FIG. 7. In FIG. 7, a multicast communication network MRTs is shown comprising a plurality of network nodes 1 which are linked with each other by communication links 72, and comprising a common source network node ("root") 4, here denoted by "r". The solid arrows indicate parts of the primary network tree, and the dashed arrows indicate parts of the secondary network tree. For example, the parts 70 of the primary network tree form a first path from the common source network node r to the network node f, and the parts 71 of the secondary network tree form a second path from the common source network node r to the network node f. The two paths from the common source network node r to the network node f are in this example node disjoint except of network node c which node is an unavoidable cut-vertex.

While an exemplary PIM-SM implementation in conventional communication systems relies on forwarding JOIN and PRUNE packets along a shortest path tree, according to an embodiment relying an PIM-SM, the shortest path tree is replaced by one of the trees of the redundant tree pair, i.e., by the primary tree. In this way, in case of a network failure, it is possible to quickly access the secondary tree of the redundant tree pair, which is guaranteed to work, if the failure is theoretically repairable.

Accessing the secondary tree after a failure can be performed in several ways, depending on what reaction time of failure recovery is preferred.

For example, the network 7 may in one embodiment be operated in recovery mode, which may mean that after a network node 1 senses loss of connection to a multicast tree (i.e., path failure), it starts joining on the secondary tree by sending PIM JOIN messages or similar activation messages which are routed on the secondary tree. In conventional approaches, recovery of multicast streams with PIM is relatively slow, since PIM needs to wait for the convergence of the unicast routing first. In contrast, according to the present embodiments, there is no waiting time since the secondary tree has been pre-calculated, and so it is immediately available.

According to an embodiment, in order to safe further time of failure recovery, the network 7 may be operated in simple protection mode, in order to avoid convergence delay stemming from the standard way of processing JOIN packets. In the protection mode, for each network node 1, both the corresponding primary tree and backup tree are built up in advance; routers (or any other network nodes) joining a multicast group are sending JOIN packets along both trees.

The secondary tree may be configured in such a way that traffic sent by the common source network node 4 along the secondary tree has a different source address (secondary IP source address) than traffic sent by the common source network node along the primary tree (primary IP source address). Such a tree is also called an (S, G) tree. (Basic) PIM (IP multicast) can use two types of trees: the (*, G) and the (S, G) trees, where S means source address and G means group address (the latter is the destination address of the IP packet, but since for multicast there is no single destination, but a group, this naming is used). When a router (as an embodiment of network node 1) gets a multicast packet, it tries to find an (S, G) entry in its database, an entry where both the source address and the group address fits. If it finds such an entry, it forwards the packets with respect to that entry. If there is no such entry, it tries to find an (*, G) entry, wherein "*" means that it fits to all the remaining sources. Such a (*, G) tree is rooted at the rendezvous point, and packets forwarded along that tree may be first sent to the rendezvous point with unicast forwarding (e.g., if only basic PIM is available).

In this way, primary traffic and backup traffic can be easily be distinguished from each other. In a failure-free situation, the common source network node 4 needs to send traffic only along the primary tree. However, if there is a failure, destinations losing traffic can instantly indicate that fact along the secondary tree, and activate traffic along the secondary tree as well. Since, according to an embodiment, the forwarding plane of the common source network node 4 is ready for processing such activation packets, the failover time will be short.

In the simple protection mode there may be several network nodes 1 which get traffic both along the primary tree and the secondary tree. This extra load will be present for only a short time, while restoration is reconfiguring the network 7 according to the new topology, but it may be desired to avoid this extra load in certain realizations.

In order to avoid the extra load, the network 7 may be operated in advanced protection mode. In advanced protection mode, the secondary tree may only be installed (built up) in the data plane, but not be active. In case of a failure, it is possible to activate the secondary tree (e.g., with a single packet sent upwards along the secondary tree). Each data plane element (network node 1) can immediately unblock the secondary tree without involving any delays of the more complex processing of JOIN messages. Naturally, such technique needs data plane processing not only at the source network node 4, but along all the network nodes 1 distributed along the secondary path.

Both protection modes enable to perform failover in a time period which does not exceed 50 ms, which is a typical requirement for fast rerouting techniques.

In order to join a multicast group receiving multicast content from a common source network node 4, a network node 1 has to register at or otherwise associate with the common source network node 4. According to an embodiment, joining the multicast groups happens similarly to PIM-SM. The only exception may be that a primary redundant tree of a pair of redundant network trees may be used instead of a shortest path tree for reaching the common source network node. That is, the JOIN messages are not routed along the (reverse) shortest path, as with plain PIM, but along the primary tree, one of the computed pair of (e.g., maximally) redundant trees. Each one of the pair of computed network trees may be selected as primary tree, but this selection may be consistent in a way that the same tree of the pair of computed network trees is selected as primary network tree and as secondary network tree at each of the network nodes 1.

The MRIB tables used for routing JOIN packets may be built such that the routing paths listed in MRIB tables reflect the redundant trees (primary tree and secondary tree), instead of reflecting reverse unicast shortest paths as it is common in conventional approaches. For example, in the embodiment shown in FIG. 7, network node f would join multicast content distributed by common source network node r by using the path f-c-b-a-r (first path for network node f).

In order to ensure consistent packet forwarding along the primary/secondary redundant trees, exactly the same two primary/secondary redundant trees should generally be computed at each network node. For example, it may be possible to use a link state routing mechanism (like OSPF or IS-IS) which is running in the background, and which explores the complete topology (e.g., whenever the algorithm needs tie-breaking, chose always the node with the lowest possible router ID), in order to compute the primary/secondary redundant trees. Computing a pair of redundant trees can be done with about the same complexity as finding the shortest paths, see for example Gábor Enyedi, Gábor Rétvári, András Császár, "On Finding Maximally Redundant Trees in Strictly Linear Time", IEEE Symposium on Computers and Communications, ISCC, Sousse, Tunisia, July 2009.

When a failure occurs, it needs to be detected, and a rerouting process may have to be carried out.

Detecting that there was a failure along a path from the common source network node 4 to a destination network node 1 may be realized by the last hop router being part of the path using a fast hello-like protocol. For example, small "heartbeat" packets (or, more generally, heartbeat signals) may be sent at a steady rate from the common source network node 4 to the destination network nodes 1. These packets may be forwarded using the same multicast destination address (along the multicast tree) as the multicast data stream itself. The absence of such a heartbeat indicates that a change to the secondary tree is necessary.

Typically, Hello-like protocols, such as used in OSPF, IS-IS or BFD, conclude that there is a failure if heartbeat packets have not been received within a pre-configured time interval. For example, if heartbeat packets are sent in 5 ms intervals from the common source network node 4 to a destination network node 1, and if a last hop router has not received heartbeats in the last 15 ms, then the last hop router may conclude that the primary tree has failed, and initiates reconnection through the secondary tree. In contrast to the heartbeat packets used by OSPF, IS-IS or BFD which are sent bidirectionally, according to an embodiment, the heartbeat packets are sent only in one direction (the source network node 4 can typically not more learn on its own that a failure has occurred). Here, the heartbeat is only sent from the multicast common source network node 4 to the destination.

Alternatively, heartbeat data packets can be avoided if there is constant heavy multicast traffic in the network 7 that signals the absence of a failure. In that case, the packets of the traffic can serve as the heartbeat; heartbeat means receiving some packet sent to the multicast group.

In the following, the mechanism of rerouting in recovery mode will be discussed.

Figure 8:
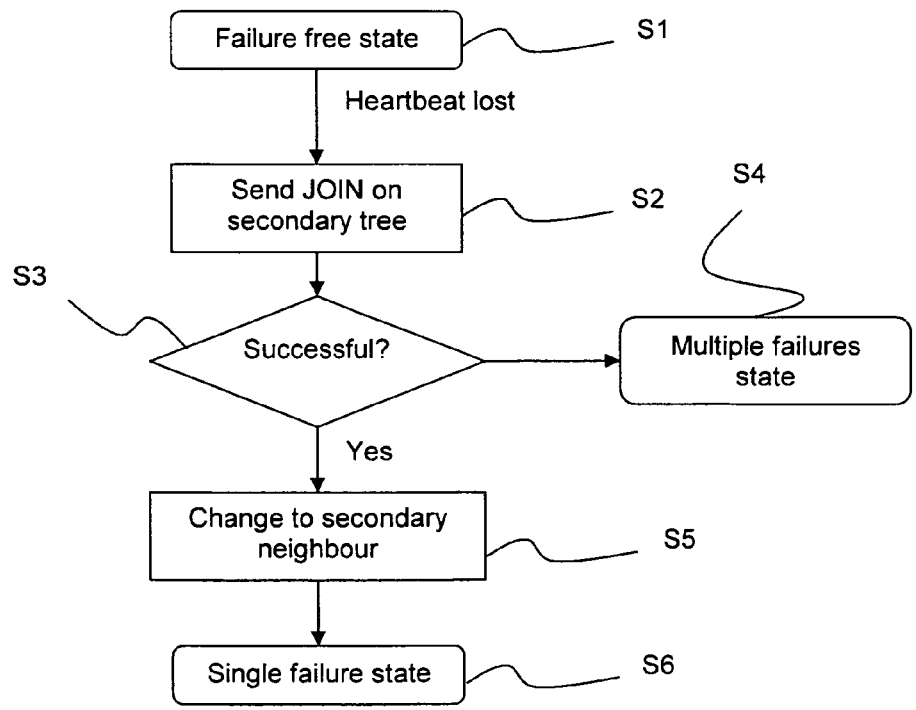
FIG. 8: is a flow chart illustrating another embodiment of operating a multicast communication network.

In recovery mode, as soon as a last-hop network node 1 (e.g., a router) detects that heartbeat packets are not received as expected, it supposes that the path along the primary tree is down. Assuming that a single failure (node, link, or single SRLG) occurred which did not split the network 7 into two networks, the path along the other tree of the (maximally) redundant tree pair is intact. In this way, there is no need to wait for the unicast convergence (like PIM-SM does), but the destination network node 1 can immediately send JOIN packets along the secondary tree which was pre-computed. Since a simple JOIN packet can easily be processed, with an optimized implementation this rejoin should not take too much time. That is, quick recovery can be ensured. This mechanism is shown in FIG. 8: At step S1, in normal operation, the system is in a failure free state. At step S2, in case of a heartbeat lost (no heartbeat packets are not received at a network node registered at the common source network node), a JOIN message is sent to the common source network node via the secondary tree. At step S3, it is determined whether sending the JOIN message to the common source network node 4 via the secondary tree has been successful. If yes, then, at step S5, heartbeat packets are sent to the network node 4 via the secondary tree, and a single failure state is reached which may be indicated at step S6. If no, then a multiple failure state is reached in step S4 which may be indicated.

In the following, the mechanisms of rerouting in simple protection mode will be discussed which may be used when the overall failover time in recovery mode would not be short enough.

Distinguishing between the two network trees of a pair of network trees may for example be done by using a new flag in messages (like in JOIN messages or PRUNE messages) routed from a destination network node 1 to the common source network node 4 (e.g., a TreeID flag, where means the primary tree, 1 means the secondary tree) or by using a new kind of PIM message type that for example may otherwise be identical to the JOIN message.

Since either of these approaches would require changes in the corresponding communication protocol, a further approach may be used, namely to assign an extra IP address to each of the protected sources and the rendezvous point. A protected source means a source node 4 (with a multicast tree) whose traffic is protected. It is not necessary to protect all multicast trees of a multicast communication network 7, but if a multicast tree is to be protected, JOIN messages have to be sent to it along both of the MRTs, so these network nodes should have two IP addresses (if changing the protocol is to be avoided), while the multicast sources which do not need to be protected may have only one IP address. This extra address enables special routing for messages, i.e., enables to selectively forward messages along the primary tree or the secondary tree of a tree pair in tree upward direction. It is easy to assign an extra IP address to each of the common source network nodes 4 or other nodes since such IP addresses are usually not needed outside the Autonomous System (AS), so even elements of the private address space can be used (e.g. 192.168.0.0/16 or 10.0.0.0/8). As already mentioned, using different IP addresses is desired to selectively forward messages (unicast control messages) along the primary tree or the secondary tree of a tree pair in tree upward direction. For forwarding multicast content in downwards direction from a common source network node 4, a single multicast IP address is enough for a multicast group.

FIGS. 9 and 10 show an example how routing of a unicast control messages (like JOIN messages or PRUNE messages) from a destination network node 1 up to a common source network node 4 may be handled using MRIB tables.

In FIG. 9, the conventional approach is shown: In a network node, table 90 is stored. Entries 91 usually represent reverse shortest paths and are derived based on unicast routing mechanisms. For example, if a message has to be sent from the network node 1 to the common source network node 4 indicated by "S1", then the network node 1 routes the unicast control message to a network node 1 indicated by entry "NextHop1". In case of a network failure which blocks this route, there is no possibility to immediately react.

In contrast, in FIG. 10, an embodiment is shown: in a destination network node 1, table 100 is stored. Entries 101 represent the first paths via the primary tree to different common source network nodes 4, and entries 102 represent the second paths via the secondary tree to the common source network nodes 4 used in the case of a failure. For example, in a failure free state, the unicast control messages which have to be sent from the destination network node 1 to the common source network node 4 indicated by "S1", are routed to a network node indicated by entry "NextHop1" (first path). In case of a network failure which blocks this route, the unicast control messages which have to be sent from the network node 1 to the common source network node 4 indicated by "S1", are routed to a network node indicated by entry "NextHop2" (second path).

Also, it is desirable to distinguish packets sent along the default tree (primary tree) from those forwarded along the backup tree (secondary tree), since otherwise forwarding loops can be formed. This can be easily realized when assigning two IP addresses to each protected source as described above since packets can be sent out through interfaces belonging to the backup (secondary) tree while having the backup IP in a source IP address field. Since multicast forwarding is based typically on both the group and the source address, this solution needs no modification in the forwarding plane. And also, this is the natural behavior of PIM-SM. Joining to an (S1, G1) tree represents a different multicast tree than an (S2, G1) tree, so different multicast forwarding entries will be installed for (S1, G1) and for (S1$_{Backup}$, G1). As it was described previously, multicast forwarding databases in the network nodes 1 may contain (S, G) and (*, G) entries. If an (S1, G1) entry and an (S2, G1) entry is available, IP data packets with the same destination address (group address) can be forwarded differently depending on the source address they contain; if the source address fits to S1, the first entry will be used, if it fits to S2, the second one. If neither of them fits, the IP data packets will use the (*, G1) entry, if there is such an entry, or will be dropped, if no entry can be found for it at all.

It should be noted that extra IP addresses may be used only in case of IP networks. Generally, "labels" may be used which describe where to forward packets, and two labels may be used per destination to describe the two trees.

When IP networks are used, the label is the (S, G) pair, the source and the group, so in order to get two labels, two different IP addresses can be assigned to the source (two different S-s are selected). Alternatively, assigning two different G-s to the two trees is also possible. Moreover, if, for example, mLDP is used, such addresses do not exist, just labels, and thus two labels are assigned to the trees locally at each node (MPLS does not use global labels, but swaps them before forwarding a packet).

An address translation in the common source network node 4 may be used. If the extra burden associated with the address translation is to be avoided, then the incoming interface of a data packet can be taken into consideration; since an incoming interface belongs only to one network tree, the network tree can be determined. If the incoming interface is already taken into consideration for each multicast routing entry for Reverse Path Forwarding (RPF) checks, it is possible to store another interface ID, so identifying that on which tree a data packet was received can be realized with simple comparing. Moreover, an interface list may also be provided (e.g., stored) for each entry for the outgoing interfaces, which makes it possible to simply add the interfaces of the backup tree (secondary tree) to the end of this list; if it is known where the backup list starts, enumerating those interfaces is easy.

Figure 12:
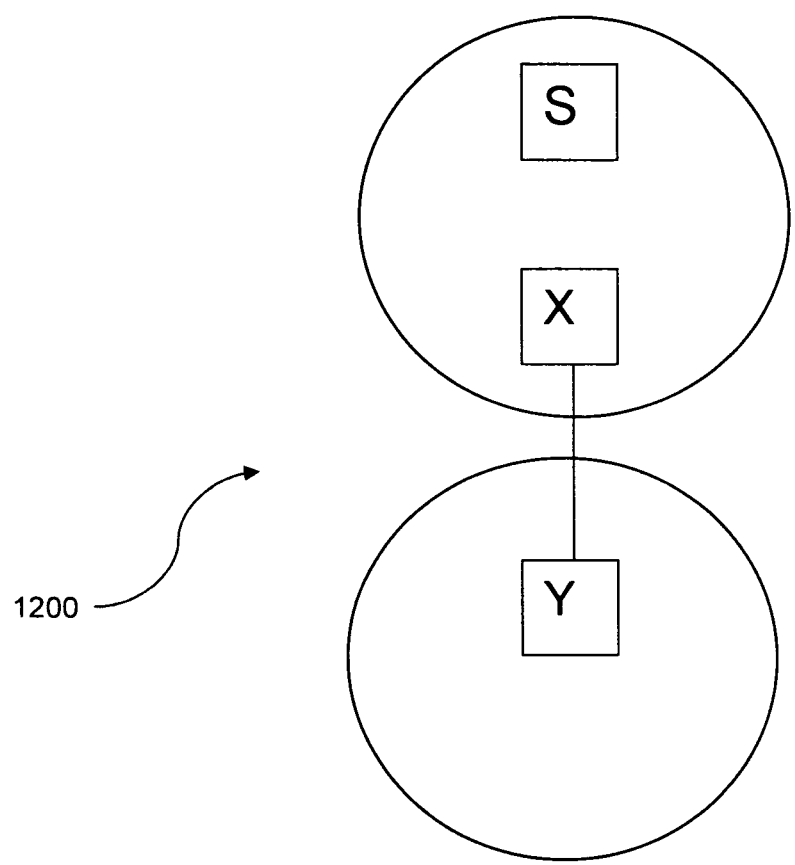
FIG. 12: is a schematic block diagram illustrating an embodiment of a multicast communication network.

In this or another embodiment, there may be a corner case where there is a cut-edge (a link providing the only connectivity towards the common source network node) in the network 7, since a node 1 receiving a packet along that link cannot decide whether the primary tree or the secondary tree was used. This case is depicted in FIG. 12. If the drawback of handling cut-edges discussed below is not acceptable for an operator, IP level cut-edges can be easily eliminated by an underlying network layer (Ethernet VLANs, two MPLS SLPs, or lightpaths for optics).

In the embodiment shown in FIG. 12, there is a cut-edge in the network 1200; the common source network node s is in 2-edge-connected component with network node x; and the other component connects through network node y.

In the embodiment shown in FIG. 12, if there is a failure cutting network node x from s, all the destinations in the other component will detect it, and will rejoin using the backup tree (which necessarily use link x-y again). However, if there was a failure in the other component, node x will receive each packet along the network trees. Forwarding the traffic of both network trees to link x-y would result in packet duplication at network node y (and all the network nodes receiving traffic from network node y), which should be avoided. This kind of duplication would be repeated at each cut-edge, causing traffic to scale exponentially with the number of cut-edges. Since network node x does not detect the loss of heartbeat (since it is an intermediate network node), and since the traffic must flow through the cut-edge even when a failure is present, only the traffic of the secondary network tree is sent through a cut-edge. Naturally, the traffic received at network node y should be forwarded along all the active links (both on the primary and the backup tree), since some network nodes may lose the connection with network node y along the secondary tree. Thus, some destinations may receive some packets twice (but never more), which could be handled by the applications (e.g., by dedicated discarding operations).

Another effect of having cut-edges in the network 7 is that if only the traffic of the network tree will be forwarded, that means that all the network nodes lose the heartbeat, even if the failure was in the component containing network node y. However, this is not typically a significant problem since the network nodes can immediately switch to the protection path with minimal traffic disruption.

As already mentioned, in recovery mode, the secondary tree is pre-calculated, however it is not pre-built. For some destination network nodes 1 (such as routers), the processing time of message packets like JOIN packets, which builds the multicast tree, may take too much time since control plane involvement is needed, in this way making the rerouting after a failure too long even without the need for waiting for the convergence of unicast routing. In order to avoid this problem, not only the primary path, but also the secondary path may be built up in advance. That is, one possibility to avoid this problem is to build up both network trees at the same time (simple protection mode). For example, a destination wanting to join a multicast group may send regular JOIN messages on both trees. The JOIN message for the primary tree may be sent to the ("normal", primary) address of a common source network node 4 (like S1 in FIG. 10), while the JOIN message for the secondary/backup tree may be sent to the backup (secondary) address of the common source network node 4 (like S1Backup in FIG. 10).

When no failure exists, the common source network node 4 sends traffic only using its primary address. Hence, there is no traffic on the secondary tree, i.e., the common source network node source 4 does not send traffic on using its secondary address.

If, however, a failure occurs, the endpoints in form of the destination network nodes 1 detect it by losing the heartbeat packets, and send an activation message to the common source network node 4 along the backup tree. When receiving it, the common source network node 4 starts sending the same traffic on both trees.

Using only the backup tree is not enough, traffic should be sent along both trees at the same time. MRTs can only guarantee that each destination network node 1 remains reachable along at least one of the trees, but not that they remain reachable along the second tree in general. Therefore, there can be some destinations network nodes 1 which lose connection along the secondary tree due to the failure, in which case their paths along the primary tree remains intact, so these nodes 1 do not even detect the failure.

The advantage of this embodiment is that it is not needed to change the forwarding plane of the destination network nodes 1 (such as routers) along the network tree. However, some change in the forwarding plane of the common source network node 4 should still take place: the common source network node 4 needs to process the activation packet indicating that the backup tree must be used as well (the control plane should not be involved to ensure a good enough reaction time).

During the time when both trees are used, intermediate network nodes 1 (such as routes) may need to forward packets on both network trees. This means some extra traffic in the network. Even if this extra traffic occurs only for a short time, while global IGP reconfiguration takes place, this may cause congestion.

The disadvantage of sending the packets of the multicast stream along both network trees concurrently during the failure can be decreased by using advanced protection mode: In advanced protection mode, when establishing a multicast tree, network nodes 1 may use conventional messages (like JOIN packets) to join on the primary tree, but may use special messages (like JOIN packets) along the secondary tree. The use of special messages along the secondary tree signals to network nodes 1 processing then that the paths should be only created (doing the authentication and similar tasks), with a "block" on the outgoing interfaces. While this block is active, no packet belonging to the multicast group is allowed to be sent out through that interface.

The special message (e.g., JOIN packet) could be implemented in different ways: It may be a new PIM packet type, e.g., a "Blocked JOIN" packet which is otherwise identical to a JOIN packet in its contents, but its type reflects the difference; or it may be a normal JOIN message comprising a flag indicating that the outgoing interface should be blocked until further notice.

In advance protection mode, when a last-hop network node 1 detects a loss of heartbeats on the primary tree, it may send an activation packet upwards on the secondary tree which causes the blocks to be removed in the path along which the activation packet is sent. A block may, e.g., be removed when this activation packet is received via the secondary tree from a lower node (router) in accordance with the MRIB table entries as, e.g., shown in FIG. 10.

To ensure a good reaction time, the activation message may be forwarded and processed in each hop (network node 1) in the dataplane. I.e., the dataplane processing may be able to set the "blocked" flag in the MFIB for the respective multicast group to "unblocked". Moreover, to facilitate quick forwarding of the activation message (failure indication packet), a unicast FIB should contain the routing information for the secondary tree. The easiest way to implement this is again to use an extra IP address for each of the protected common source network nodes 4 and the rendezvous point, the forwarding entry for which address reflects next-hop information towards the common source network node 4 on the secondary tree.

An activation packet may be recognized for forwarding along the secondary path even for the alternative when the common source network node has no secondary IP address. This is an already solved problem since the data plane of all the routers should process that data packet.

The activation packet is special since it has to be forwarded and processed by the routers (network nodes 1) it reaches, so these routers can remove the blocks along the path of the activation packet.

An example of advanced protection mode is shown in FIG. 11. In FIG. 11, it is assumed that network node c wants to join to common source network node r. A JOIN packet is sent along the primary tree from network node c to common source network node r via (primary) path c-b-a-r, which is stored in the MRIB table. In addition, along the secondary tree, a Blocked JOIN packet is sent, i.e., along path c-d-e-r (using e.g. a PIM daemon). This Blocked JOIN packet differs from the conventional JOIN packet in that it causes interfaces along this path to be blocked from transporting data packets from the common source network node r to the network node c.

In case of a failure free situation, common source network node r uses the primary tree (segments 70) for forwarding multicast content to network node c as indicated in FIG. 7. When there is a failure, and the primary path goes down (e.g. suppose that network node a fails), network node c detects loss of heartbeats (loss of control data packets) and sends a special unicast activation packet comprising the secondary IP destination address of the common source network node r. This special destination address corresponds to a FIB entry which reflects routing upwards along the secondary tree. After the routers (network nodes) touched by the forwarding of the special unicast activation packet have forwarded this packet, they remove the block of their interfaces, and the alternative (secondary) path becomes active. That is, the special unicast activation packet is not processed only by the common source network node r, to which it is sent, but by all of the network nodes along the path c-d-e-r as well, i.e., routers along the path forward the packet and process it.

These packets may not only be processed by the multicast common source network node to which they are sent, but all the network nodes along the path as well; routers along the path may forward the data packet and process it.

Since blocks along the secondary path must be removable without the involvement of the control plane, the special unicast activation packets removing those blocks should be easily recognizable. Thus, for example, UDP packets with a (special) well known destination port address may be used.

Leaving a multicast group may be done in a manner analogue to what conventional PIM-SM does, except that PRUNE packets may be forwarded along the active tree(s) (both along blocked and unblocked ones). Moreover, similarly to PIM, some timeout may be applied, so network nodes may be removed from the trees if JOIN packets keeping up the connection are not received in time.

In the case of a single failure, the destinations which lost the connection may immediately rejoin the multicast group using the secondary tree. However, sooner or later it is advantageous to prepare for another failure, and compute new (maximally) redundant trees with respect to the new topology caused by the failure. Naturally, this reconfiguration should not cause another traffic outage.

When there is reconfiguration after a single failure, the connection is stable at each of the destinations, meaning that each of them is connected to the source along either the default, or the backup tree. The make-before-break principle can be applied. Therefore, it is possible to all the destinations, to rebuild the other tree without any problem in the first phase. When each of the network nodes 1 are ready with the first phase (after some time), they can change to the freshly built tree, and reconfigure the other one if it is needed (this is the second phase). When the second phase is ready, network nodes 1 receiving traffic along the secondary tree can finally switch back to the default one and finish the reconfiguration.

A Shared Risk Link Group (SRLG) is a set of links, which usually fail together. Protection against any possible SRLG is NP-complete, so it cannot typically be provided with redundant trees. However, the two most common types of SRLGs can be protected. For "local SRLGs", which are made up by links connected to a common router (e.g. links connected to the same line card), the embodiments are suitable, since they can handle them as a node failure.

LANs are another important source of SRLGs. They can be handled easily again, if the (maximally) redundant tree computation mechanism considers LANs as pseudo nodes. Naturally, if the next hop is a pseudo node, that node cannot be put into the IP forwarding table; in this case the next-next hop is needed, which is not a problem, since the whole trees can be computed.

As has become apparent from the embodiments, the technique presented herein provides various advantages. Reconfiguration using the recovery mode is much faster in the case of any single failure than in the case of using conventional PIM-SM, since it is not necessary to wait for the convergence of unicast routing. When using protection mode, the paths are prebuilt in either way, and the activation of the backup tree is expected to be far below the 504 ms convergence limit of fast reroute. The simple protection mode has the additional advantage that intermediate network nodes do not need to support new kinds of activation packets, and only the last-hop and first-hop (source) routers need to recognize it. Another advantage is that the implementation of the proposed mechanisms in the data plane (which is often considered as a hard task due to requiring low level programming) is quite easy. Moreover, it will be appreciated that similar advantages would result in case the teaching presented herein is implemented in an mLDP context.

While the technique presented herein has been described in relation to exemplary embodiments, it is to be understood that this description is for illustrative purposes only. Accordingly, it is intended that the invention be limited only by the scope of the claims appended hereto.

The invention claimed is:

1. A method of operating a network node of a multicast communication network comprising a plurality of network nodes that are interconnected with each other by communication links, wherein the network node is associated with a common source network node, the method comprising:
   determining a first path that connects the network node to the common source network node along a primary network tree, and determining a second path that connects the network node to the common source network node along a secondary network tree, wherein the primary network tree and the secondary network tree are realized as maximally redundant trees and wherein the first path and the second path show redundancy with respect to each other;
   receiving, at the network node, multicast data from the common source network node via the first path;
   triggering, by the network node, reception of multicast data from the common source network node via the second path in response to the network node detecting a failure of the first path, by sending a message to the common source network node to cause the multicast data to be sent via the second path.

2. The method of claim 1, wherein the first path and the second path show as much redundancy with respect to each other as possible.

3. The method of claim 1, further comprising carrying out a calculation process in the network node by which the primary network tree and the secondary network tree are respectively determined.

4. The method of claim 1, further comprising sending a failure message from the network node via the second path towards the common source network node, in response to the network node detecting a failure.

5. The method of claim 4, wherein, the following processes are carried out:
   checking whether signaling has been received at the network node from the common source network node via the first path; and
   detecting the failure in response to the network node failing to receive signaling as expected.

6. The method of claim 1, further comprising maintaining a primary source IP address assigned to the primary network tree and a secondary source IP address assigned to the secondary network tree, and, when forwarding IP data packets from the network node to a further network node via the primary network tree, adding the primary source IP address to the IP data packet before it is forwarded, and, when forwarding IP data packets from the network node to the further network node via the secondary tree, adding the secondary source IP address to the IP data packet before it is forwarded.

7. The method of claim 1, further comprising activating the first path by sending an activation message from the network node to the common source network node via the first path, and/or activating the second path by sending an activation message from the network node to the common source network node via the second path.

8. The method of claim 7, further comprising:
   associating the network node with the common source network node by sending an activation message from the network node to the common source network node via the first path;
   receiving, at the network node, after having sent the activation message to the common source network node, multicast data from the common source network node via the first path;
   sending, in response to the network node detecting the failure of the first path, an activation message from the network node to the common source network node via the second path; and
   receiving, at the network node, after having sent the activation message to the common source network node, multicast data from the common source network node via the second path.

9. The method of claim 8, further comprising, after having sent the activation message to the common source network node via the second path, receiving multicast data at the network node via the first path and via the second path concurrently.

10. The method of claim 7, further comprising:
associating the network node with the common source network node by sending a path build message from the network node to the common source network node via the first path, and by sending a path build message from the network node to the common source network node via the second path;
receiving, at the network node, after having sent the path build messages to the common source network node, multicast data from the common source network node via the first path;
sending, in response to the network node detecting the failure of the first path, an activation message from the network node to the common source network node via the second path; and
receiving, at the network node, after having sent the activation message to the common source network node, multicast data from the common source network node via the second path.

11. The method of claim 10, further comprising, after having sent the activation message to the common source network node via the second path, receiving multicast data from the common source network node via the first path and via the second path concurrently.

12. The method of claim 7, further comprising:
associating the network node with the common source network node by sending a path build message of a first type from the network node to the common source network node via the first path, and sending a path build message of a second type from the network node to the common source network node via the second path;
receiving at the network node, after having sent the path build message of the first type to the common source network node, multicast data from the common source network node via the first path;
sending, in response to the network node detecting the failure of the first path, an activation message from the network node to the common source network node via the second path; and
receiving, at the network node, after having sent the activation message to the common source network node, multicast data from the common source network node via the second path.

13. The method of claim 12, wherein the path build message of the first type activates the first path, and wherein the path build message of the second type activates the second path, but preliminarily blocks data transmission from the common source network node to the network node via the second path, wherein the preliminary blocking is released as soon as the activation message is sent from the network node to the common source network node.

14. The method of claim 1, further comprising:
determining, after having detected a failure of the first path, a new primary network tree and a new secondary network tree within the multicast communication network, wherein the new primary network tree and the new secondary network tree share the common source network node, wherein a new first path which connects the network node to the common source network node along the new primary network tree, and a new second path which connects the network node to the common source network node along the new secondary network tree, are assigned to the network node, wherein the new first path and the new second path show redundancy with respect to each other; and
receiving at the network node, after having determined the new primary network tree and the new secondary network tree, data from the common source node via the new first path.

15. A method of operating a common source network node of a multicast communication network comprising a plurality of network nodes that are interconnected with each other by communication links, wherein the multicast communication network comprises a primary network tree and a secondary network tree that share the common source network node, and wherein, to each of a plurality of network nodes of the multicast communication network, a first path which connects the network node to the common source network node along the primary network tree, and a second path which connects the network node to the common source network node along the secondary network tree are respectively assigned, wherein the first paths and the second paths show redundancy with respect to each other, and wherein the primary network tree and the secondary network tree are realized as maximally redundant trees, the method comprising:
sending multicast data from the common source network node to each of the plurality of network nodes associated with the common source network node via the respective first paths;
upon receipt by the common source network node of a message from a network node indicating a failure of the first path assigned to the network node, sending data from the common source network node to at least one of the plurality of network nodes which associate with the common source network node via the respective second paths.

16. A method of operating a multicast communication network comprising a plurality of network nodes which are interconnected with each other by communication links, the method comprising:
determining a primary network tree and a secondary network tree within the multicast communication network, wherein the primary network tree and the secondary network tree share a common source network node, and wherein, to each of a plurality of network nodes of the multicast communication network, a first path that connects the network node to the common source network node along the primary network tree, and a second path that connects the network node to the common source network node along the secondary network tree are respectively assigned, wherein the first paths and the second paths show redundancy with respect to each other, and wherein the primary network tree and the secondary network tree are realized as maximally redundant trees;
sending multicast data from the common source network node to each of the plurality of network nodes associated with the common source network node via the respective first paths;
in response to a network node detecting a failure of the first path assigned to the network node, sending data from the common source network node to the network node via the respective second path.

17. A non-transitory computer-readable medium comprising program code portions stored thereupon and configured so that, when executed by a processor in a network node of a multicast communication network comprising a plurality of network nodes that are interconnected with each other by communication links, wherein the network node is associated with a common source network node, the program code portions cause the processor to:

determine a first path that connects the network node to the common source network node along a primary network tree, and determine a second path that connects the network node to the common source network node along a secondary network tree, wherein the primary network tree and the secondary network tree are realized as maximally redundant trees and wherein the first path and the second path show redundancy with respect to each other;

receive, at the network node, multicast data from the common source network node via the first path;

trigger, by the network node, reception of multicast data from the common source network node via the second path in response to the network node detecting a failure of the first path, by sending a message to the common source network node to cause the multicast data to be sent via the second path.

18. A multicast communication network node of a multicast communication network comprising a plurality of network nodes which are interconnected with each other by communication links, wherein the network node is configured to be associated with a common source network node, the network node being:

configured to determine a first path that connects the network node to a common source network node along a primary network tree, and to determine a second path that connects the network node to the common source network node along a secondary network tree, wherein the first path and the second path show redundancy with respect to each other, and wherein the primary network tree and the secondary network tree are realized as maximally redundant trees; and configured to receive multicast data from the common source network node via the first path, wherein the network node is further configured to detect a failure of the first path, and to trigger reception of multicast data from the common source network node via the second path by sending a message to the common source network node, in response to detecting the failure of the first path.

19. A common source network node that can be operated in a multicast communication network comprising a plurality of network nodes which are interconnected with each other by communication links, wherein the multicast communication network comprises a primary network tree and a secondary network tree that share the common source network node, and wherein, to each of a plurality of network nodes of the multicast communication network, a first path which connects the network node to the common source network node along the primary network tree, and a second path which connects the network node to the common source network node along the secondary network tree are respectively assigned, wherein the first paths and the second paths show redundancy with respect to each other, and wherein the primary network tree and the secondary network tree are realized as maximally redundant trees, the common source network node being:

configured to send multicast data from the common source network node to each of the plurality of network nodes associated with the common source network node via the respective first paths; and configured to determine whether it has received a message from a network node indicating a failure of the first path assigned to the network node, and configured to cause the communication unit to send data from the common source network node to each of the plurality of network nodes associated with the common source network node via the respective second paths, in response to receiving the message.

\* \* \* \* \*